US007243841B1

(12) United States Patent
Nelson et al.

(10) Patent No.: US 7,243,841 B1
(45) Date of Patent: Jul. 17, 2007

(54) ENTERPRISE POLLING SYSTEM FOR ELECTRONIC CASH REGISTERS

(75) Inventors: Mark N. Nelson, Longmont, CO (US); Andrew James Baumgartner, Albuquerque, NM (US)

(73) Assignee: Ba-Bing! LLC, Denver, CO (US)

( * ) Notice: Subject to any disclaimer, the term of this patent is extended or adjusted under 35 U.S.C. 154(b) by 200 days.

(21) Appl. No.: 11/070,542

(22) Filed: Mar. 1, 2005

(51) Int. Cl.
*G06K 5/00* (2006.01)

(52) U.S. Cl. ....................................... 235/380; 235/381

(58) Field of Classification Search ................ 235/380, 235/375, 382, 382.5, 379, 381; 705/39, 10, 705/11, 12, 13, 4, 36 R
See application file for complete search history.

(56) References Cited

U.S. PATENT DOCUMENTS 4,355,372 A 10/1982 Johnson et al.
4,972,504 A 11/1990 Daniel et al.
5,202,827 A * 4/1993 Sober ....................... 705/36 R
5,490,060 A 2/1996 Malec et al.
5,535,407 A * 7/1996 Yanagawa et al. ............ 705/39
5,623,662 A * 4/1997 McIntosh .................... 707/204
5,832,458 A 11/1998 Jones
6,078,891 A 6/2000 Riordan et al.
6,129,274 A * 10/2000 Suzuki ....................... 235/381
6,145,740 A * 11/2000 Molano et al. ............. 235/380
6,230,143 B1 5/2001 Simons et al.
6,351,689 B1 2/2002 Carr et al.
6,383,076 B1 5/2002 Tiedeken
6,633,851 B1 10/2003 Engler et al.
6,640,334 B1 10/2003 Rasmussen
6,751,681 B2 6/2004 Shinichiro et al.
6,912,631 B1 * 6/2005 Kekre et al. ................ 711/162
2003/0037192 A1 2/2003 Engstrom
2003/0074254 A1 * 4/2003 Iijima .......................... 705/10
2004/0148225 A1 7/2004 Olafsson
2004/0186970 A1 * 9/2004 Kekre et al. ................ 711/162

FOREIGN PATENT DOCUMENTS

WO WO97/29446 8/1997

OTHER PUBLICATIONS

"Protocol & Interface Conversion for Legacy ATMs & POS Trminals", http://www.jbmelectronics.com/product/ap-protocolconv.htm, jbm Electronics,(2005),1-4.
"What's New POS Terminals", http://www.crs.usa.com/whatnew2.asp, (2005).

* cited by examiner

*Primary Examiner*—Thien Minh Le
(74) *Attorney, Agent, or Firm*—Jeffrey D. Myers; Peacock Myers, P.C.

(57) ABSTRACT

A method and system for transmitting information from a point of sale terminal such as an electronic cash register to a remote site. The system eliminates the need for a computer to operate the point of sale terminal at the store location. The system includes modifying the firmware of the point of sale terminal to store the data from the periodic transactional report of the terminal in data storage areas within the POS terminal. This data is later retrieved and transmitted to the remote central office or data warehouse.

8 Claims, 3 Drawing Sheets

ENTERPRISE POLLING SYSTEM FOR ELECTRONIC CASH REGISTERS

FIELD OF THE INVENTION

This invention relates to the field of electronic cash registers and more particularly to polling systems for retrieving information from electronic cash registers.

BACKGROUND OF THE INVENTION

Most retail operations require extensive reporting of sales, inventories, taxes, expenses and other information critical in the operation of the business. While some operations still perform these reports manually, most now perform these reports automatically through their Point of Sale equipment. These POS terminals combine the cash register functions with additional functions that record transactions for downloading into computers. This downloading can occur on demand or periodically at defined intervals, usually daily.

The information that is gathered from the POS equipment is downloaded into a computer that is maintained at the site of the operations. This information may then be manipulated into reports for operating the store. For example, the sales figures can be calculated, the inventory levels determined, the employee time sheets examined, taxes to be paid, and many other types of information may be determined. This information is critical to the profitability and operation of most retail stores.

Franchise or multiple store operations often require the transmittal of this information to a central office. This transmittal of information often occurs on a daily basis. Polling software systems are typically utilized to gather the information from the computers in each store and transmit via modem to the central office. These polling systems include commercially available units such as Aloha Enterprise by Aloha; SurePOS by IBM; and others.

These systems all require the utilization of a computer at the store operation to gather information from the electronic cash registers. The information that is retained on the electronic cash register or other Point of Sale equipment is temporarily stored on the equipment, then downloaded to the computer at a periodic interval, usually daily, or on demand. That information may then be manipulated into a report that is either viewed by the local store management or transmitted to the central office.

A number of problems have arisen with the presently available polling systems. One problem is that a computer is required in order to download the information from the electronic cash register. Many operations prefer that a computer not be available at the local operation due to security and other issues. Another problem is that the information that is transmitted to the central office may be in different formats.

Thus there is a need for an enterprise system that will allow remote polling of point of sale terminals that operate in stand alone configurations without an onsite computer.

SUMMARY OF THE INVENTION

The present invention provides the solution to the need for an enterprise system that will allow remote polling of stand alone point of sale terminals. The present invention, in a preferred embodiment, is able to provide this system without extensive capital investment or hardware modification. The system, in a preferred embodiment is scalable to a large number of terminals and locations. The system is able to poll numerous terminals and compile information in numerous reporting requirements from disparate platforms.

The system of a preferred embodiment of the present invention provides an application or set of instructions within the operating system of the point of sale terminal. The application instructs the terminal that when a report is printed that provides a summary or details of the transactions that have occurred through the terminal, that the information contained on that report is also stored in a buffer within the terminal. This information is later retrieved and transmitted to a remote site.

The application also stores data that relates to the particular terminal. This data may include the terminal identification, the store identification, product mix and other information that may not be contained in the transactional data report.

In another preferred embodiment of the present invention, the system includes a method for modifying a commercially available point of sale terminal. The commercially available terminal includes its operating system on PROMs in the form of firmware. The method of the preferred embodiment of the present invention modifies the firmware to add instructions in the form of executable code. These instructions enable the system to create at least one data storage area. The instructions also cause the periodic transactional reports to be stored in the data storage area. Additional data relating to the particular store, store group and terminal may be stored there as well. This information is then retrieved and transmitted to the remote site.

The system of a preferred embodiment of the present invention also includes a communications component connected to the terminal. This communications component may be a dial-up modem for use over ordinary telephone connections, network or broadband internet connections, or satellite technology such as Very Small Aperture Technology. The communications component allows transmission of the stored information without the need of an onsite computer.

Another preferred embodiment of the present invention provides a data compilation component. The data compilation component is able to compile data regardless of the platform from which the information is retrieved. The data compilation component also is able to sort the information into appropriate reports for routing to different groups or departments. For example the information may be sorted by stores, store groups, product mixes or information relevant to accounting, financial, human resources, purchasing, marketing, etc.

These and other features of the present invention will be evident from the ensuing detailed description of preferred embodiments and from the drawings.

DETAILED DESCRIPTION OF THE DRAWINGS

DETAILED DESCRIPTION OF PREFERRED EMBODIMENTS

The present invention provides a system for providing remote polling of electronic cash registers and other point of sale devices as well as other information retaining systems.

Preferred embodiments of the present invention are described below. It is to be expressly understood that these exemplary embodiment are provided for descriptive purposes only and are not meant to unduly limit the scope of the present inventive concept. Other embodiments and variations of these embodiments are considered within the present inventive concept as set forth in the claims herein. For explanatory purposes only, the description of electronic cash registers is intended to also encompass any type of point of sale terminal, transaction entry device, or any other information retaining devices. The description of electronic cash registers in preferred embodiments is discussed primarily for the purposes of understanding the method of operation. It is to be expressly understood that other devices are contemplated for use with the present invention as well.

Overview

Figure 1:
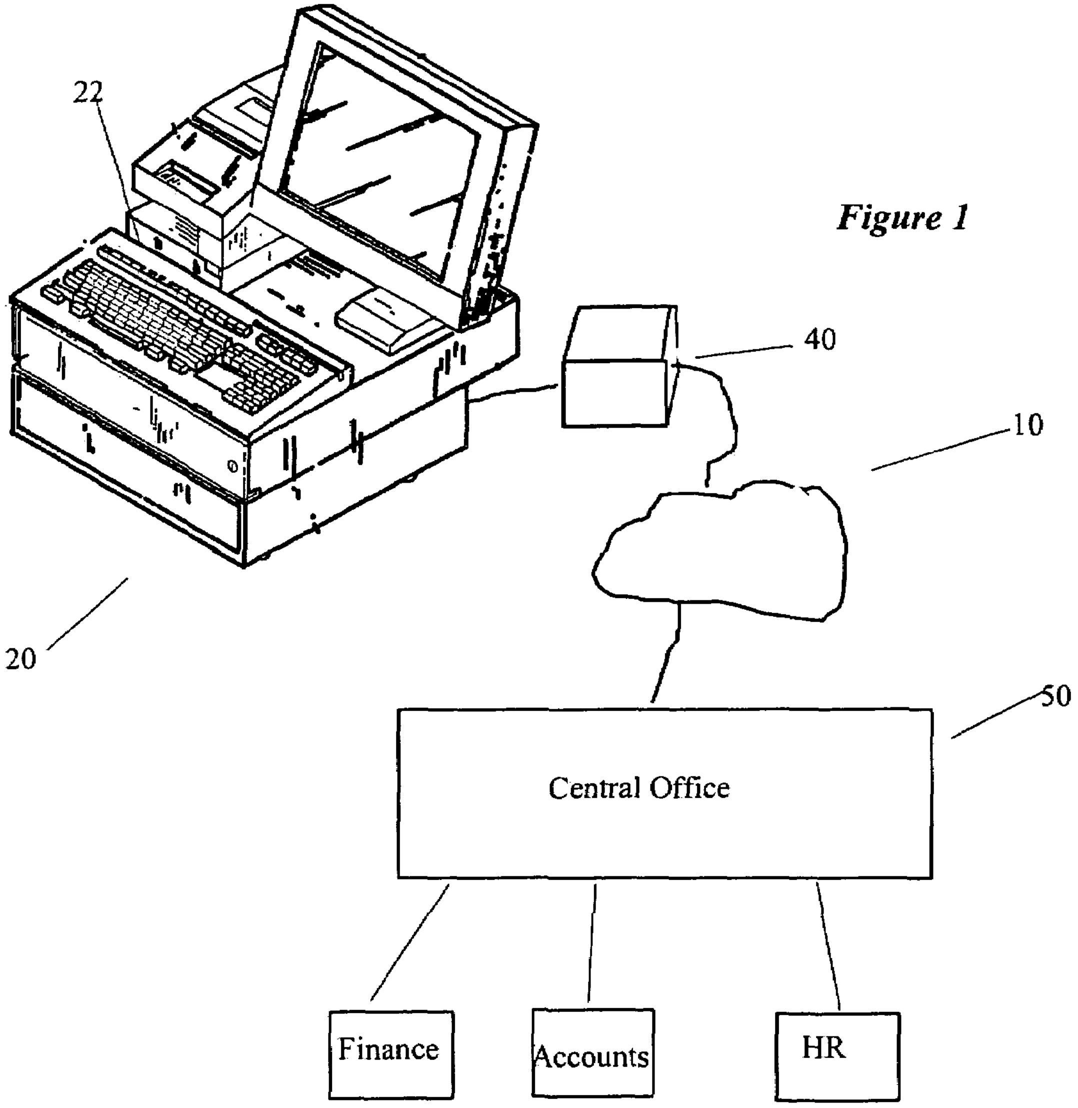
FIG. 1 is schematic view of the enterprise polling system of a preferred embodiment of the present invention.
Figure 2:
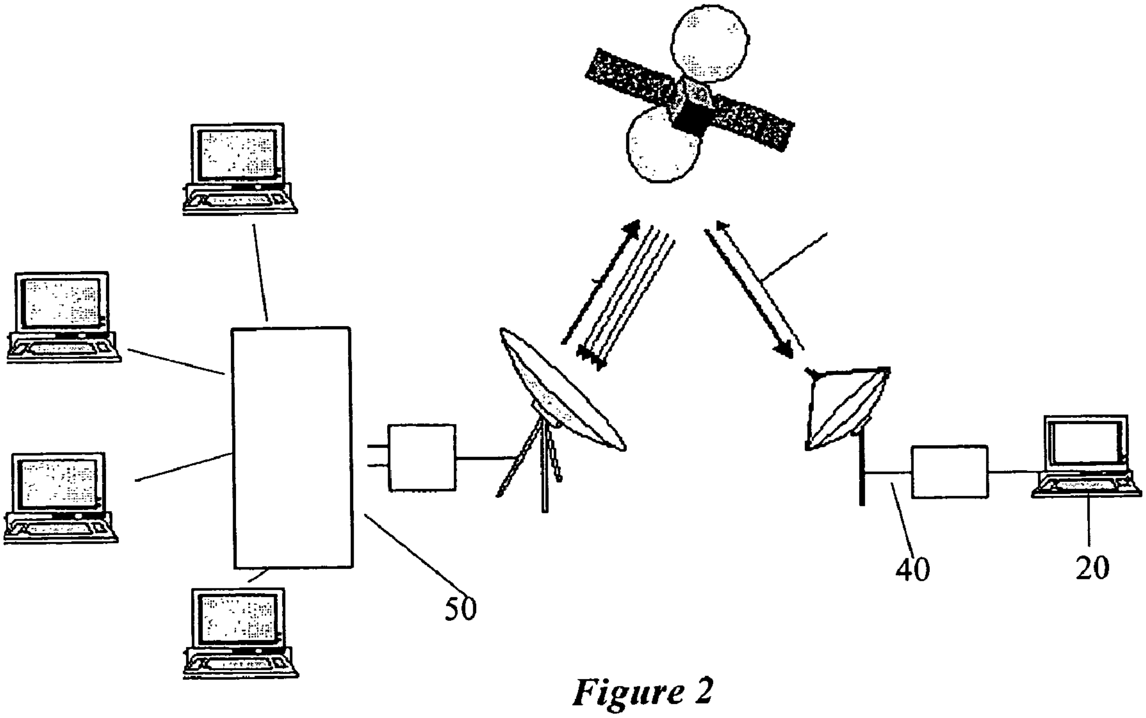
FIG. 2 is a schematic view of the system of the embodiment of FIG. 1 configured for satellite technology.
Figure 3:
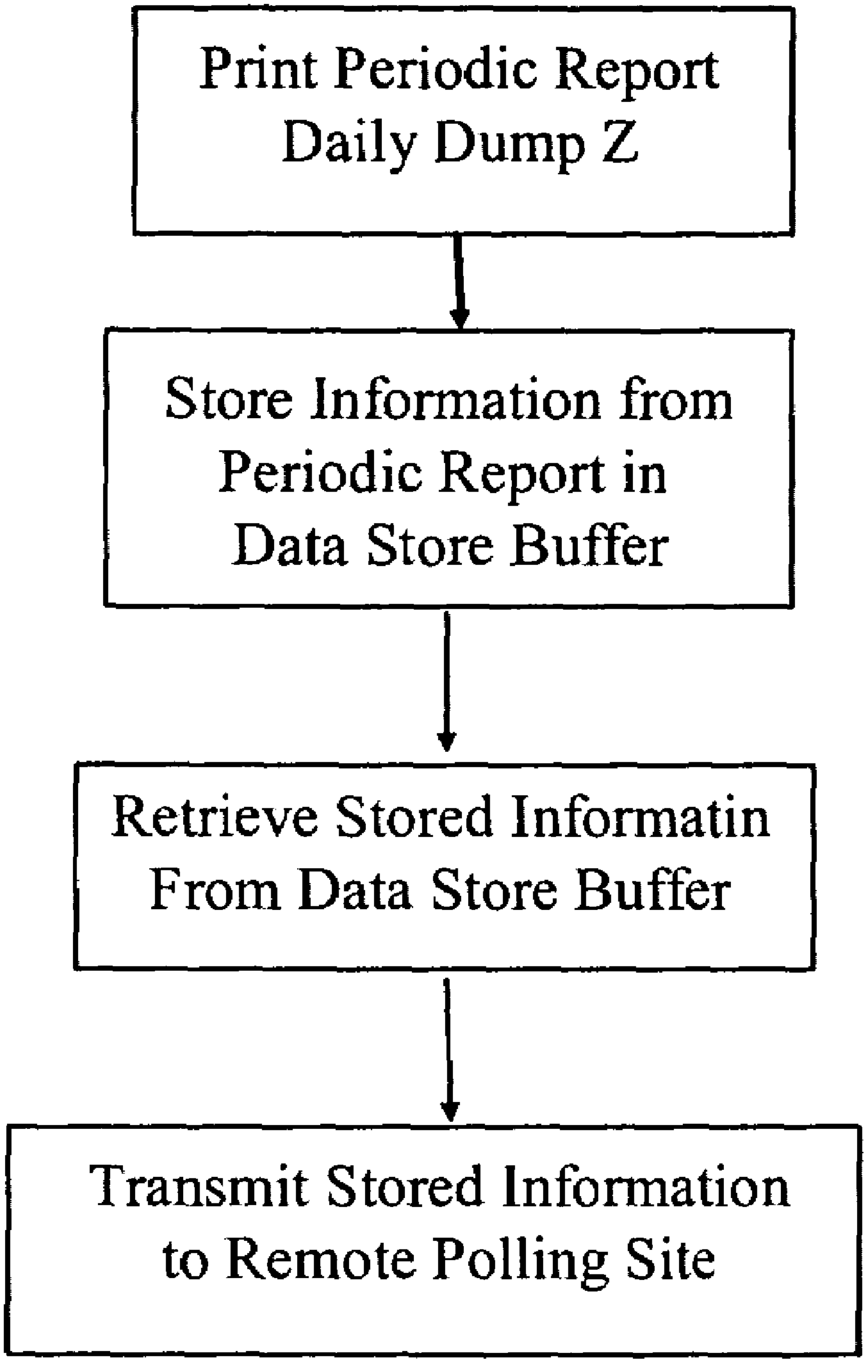
FIG. 3 is a workflow diagram of the method of a preferred embodiment of the present invention.

A preferred embodiment of the present invention is illustrated in FIG. 1. The system 10 of this preferred embodiment includes an electronic cash register 20 ("ECR"). The electronic cash register 20, in this preferred embodiment, is a stand-alone register that does not need an additional computer or network onsite in order to operate. The ECR includes a transaction entry device, such as keyboard, touch pad or other data entry system. Typical transactions include sales, employee time keeping, and other transactions. It operates through the use of updatable firmware stored in the non-volatile portion of flash ROM memory 24. An example of a commercially available electronic cash register of this type is the NEC RSenCounter 4000. The present invention modifies the firmware to collect and store information within the buffers of the ECR.

The system 10 further includes a polling client 30. The polling client retrieves summary and transactional information from the electronic cash register 20. A communications component 40 then transmits the information that is collected by the polling client to a remote site.

The remote site 50 may be the central office of multiple retail locations, or a data warehouse that will then transmit the collected information or reports to the appropriate locations. The collected information is compiled by a data sorting component 60 prior to the transfer of appropriate information to the individual management reporting systems, such as accounting, human resources, and other departments.

The system 10 of the present invention enables the creation of an enterprise polling system for use with point of sale terminals that operate in a stand alone manner without direct connection to an onsite computer. The system 10 will be discussed in greater detail below.

Preferred Embodiment

In a preferred embodiment of the present invention, the electronic cash register ("ECR") 20 operates by flash ROM (Read Only Memory) technology. This technology includes a set of executable instructions or code ("firmware") to be stored in nonvolatile memory in the ECR 10. The executable code may be updated by connection to a host computer either prior to the ECR entering into service, or later by connection via a CD drive, floppy disk drive, a Universal Serial Buss (USB) connection, or even by a remote computer through the communications component 40. The preferred embodiment of the present invention is able to update the PROM 22 of the ECR 20 to modify or replace the executable code ("firmware") within the ECR. Thus, the present invention is able to take advantage of commercially available technology without extensive hardware modification.

The firmware or executable code stored in the nonvolatile portion of the flash ROM is modified to as discussed below to change the operation of the ECR 20. This modification is performed in accordance with readily available technology such as used to modify or update firmware stored in flash ROM devices. The present invention is not limited to existing technology that is commercially available but also includes additional technology as it is developed that will allow modification to the firmware or operating systems of the ECR.

The transactions that are entered into the ECR may include time-keeping functions when an employee logs into the ECR, sales transactions, taxes that were collected, product inventory, and other information. The ECR stores these transactions into buffers within the ECR.

A second feature of most ECRs is the end of day report printing. A typical ECR will perform a daily dump of information that prints all of the stored information and clears that information from the ECR. Additional reports can be created on demand that will print the stored information without clearing the buffers.

Typically, a polling client is used that will retrieve the information stored in these buffers for storage in a back room computer. The polling client itself in these existing systems is stored on the back room or remote computer. Thus it is necessary to create and maintain a network of computers and ECRs in order to automatically retrieve the information from the ECR. Commercially available polling clients operate by disabling the local printing of the daily report and instead send that information to the computer connected to the ECR for printing at that location.

The present invention enables the elimination of the need for a local computer and network by providing a unique system that modifies commercially available ECRs. A preferred embodiment of the present invention accomplishes this by modifying the firmware of the existing ECR. The modification to the firmware under the system of a preferred embodiment of the present invention includes adding an auditing application to the firmware of the existing ECR. It is to be expressly understood that this auditing application is simply a set of instructions in the form of executable code that is added to the ECR firmware.

This auditing application creates data storage areas or buckets within the ECR. The auditing application instructs the ECR to save the transactional data from the end of day report that is printed on the ECR. During the normal operation of the ECR, the ECR will create a periodic report, normally at the end of the business day or other scheduled period. This report is normally printed at the ECR for evaluating the transactions during that period and for auditing purposes. Existing polling clients will disable this local printing and instead print it at the remote computer. The preferred embodiment of the present invention instead allows this report to be printed locally and also saves the data from the report. This data is saved in the data storage areas that were created by the application.

The auditing application also stores additional information in the data storage buckets. This additional information includes reporting time stamp signatures, store identification detail, local product mix tables, pricing information and any other relevant information.

The information that is obtained from the end of the day report and from the additional information may be in different formats or in formats that are not suitable for retrieval or transmittal as discussed below. The auditing application of a preferred embodiment of the present invention saves this information in a unique format. This enables the data to be later transmitted without error and with the use of commercially available polling and communications components. It is also to be understood that this feature may be omitted as well in other embodiments.

The preferred embodiment of the present invention creates multiple data storage areas to enable the information for multiple time periods to be stored. For example, in one preferred embodiment, the firmware of the ECR is modified to enable two data storage areas to be created on the non-volatile memory within the ECR. This enables data collected for the report on the time period that information is stored and cleared to be "printed" into the data store (bucket) for each of two time periods. Typically these time periods are daily, but other time periods may be used as well.

The system 10 utilizes polling client 30 to retrieve the information that is stored in the data buckets within the ECR. The polling client 30 includes scripts or programming that will retrieve information from an ECR on a regular schedule or on-demand. It then transmits this information through a communications component 40 to a host computer. An example of a commercially available polling client is RSConnect by NEC. The polling client establishes communication with the ECR and retrieves the stored information from the data storage areas. The information at the ECR is then cleared from the ECR.

The communications component 40 may be an external dial-up modem connected to ordinary telephone lines for communication between the host computer and the ECR. In another preferred embodiment, the communications component 40 includes a satellite link-up, such as VSAT (Very Small Aperture Terminal) architecture. This enables remote access between a central office or data warehouse and the POS ECR.

In a preferred embodiment of the present invention, the information from the data storage buckets is transmitted by the polling client 30 through the communications component 40 to the central office 50. This information is in the format provided by the audit application. This format may vary depending on the type of the ECR. Thus, since the information may be received at the central office 50 in differing formats, the system 10 includes in this preferred embodiment a data sorting component 60. The data sorting component compiles the retrieved information into a format that can be utilized in evaluating the information from the ECR. Additionally the information may be sorted into individual reports for transmitting to different groups, such as Financial, Purchasing, Accounting, Human Resources, and others. Also the reports may be generated for individual stores or store groups.

In another preferred embodiment of the present invention, the polling client 30 is also included in the modified firmware of the ECR. The polling client then pushes the stored information from the data storage areas to the remote site.

In another preferred embodiment of the present invention, the auditing application is incorporated directly into the firmware of the ECR at the time of manufacture of the ECR. In this embodiment, the application may be used in systems that do not utilize flash ROM or other updatable firmware.

In another preferred embodiment of the present invention, the system may be incorporated into a hardware component that is connected to the ECR. The hardware component includes the polling client, data storage for the information and the communications component. This system eliminates the need to reprogram the ECR. The hardware component may also be incorporated into one or more other electronic devices or disguised within the store operation, such as in a clock, music box or other ordinary devices.

It is to be expressly understood that the above descriptive embodiments are provided for descriptive purposes only and are not meant to limit the claimed inventions. Other embodiments are considered to be within the scope of the claimed invention.

What is claimed is:

1. A method for obtaining information from a commercially available electronic cash register that has programmable firmware, the method comprising the steps of:

modifying the programmable firmware to create at least one data storage area;

modifying the programmable firmware to store data relating to periodic reports of the transactions entered in the electronic cash register in the at least one data storage area;

retrieving the stored data from the at least one data storage area; and transmitting the retrieved stored data to a remote host.

2. The method of claim 1 wherein the method further comprises the step of storing additional information relating to the electronic cash register in the at least one data storage area.

3. The method of claim 1 wherein the method further comprises the step of storing the data in a defined format.

4. The method of claim 1 wherein the method further comprises the step of providing a data sorting component that compiles the stored data regardless of the format of the stored data into a format that can be utilized in evaluating the stored data.

5. The method of claim 1 wherein the method further comprises the steps of providing a plurality of data storage areas in the electronic cash register and storing data relating to transactions during different time periods in each of the plurality of data storage areas.

6. The method of claim 1 wherein the step of retrieving the stored data comprises providing a polling client that retrieves the stored data from the at least one data storage area and transmits the stored data to a remote host computer.

7. The method of claim 1 wherein the step of transmitting the stored data comprises utilizing a dial-up modem to transmit the stored data to a remote host.

8. The method of claim 1 wherein the step of transmitting the stored data comprises utilizing satellite technology to transmit the stored data to a remote host.

* * * * *